Patented May 19, 1942

2,283,627

UNITED STATES PATENT OFFICE 2,283,627

HIGH MOLECULAR WEIGHT HALOGEN- AND SULPHUR-CONTAINING DERIVATIVES OF HYDROCARBON POLYMERS

Anthony H. Gleason, Westfield, N. J., assignor, by mesne assignments, to Jasco, Incorporated, Baton Rouge, La., a corporation of Louisiana No Drawing. Application December 11, 1940, Serial No. 369,620

10 Claims. (Cl. 260—94)

This invention relates to novel high molecular weight sulphur and halogen-containing derivatives of linear type hydrocarbon polymers characterized by the plastic solid polymers formed from isobutylene. It is particularly concerned with a method of obtaining a product having tough and rubbery attributes and high resistance to dissolution by many common organic solvents.

It is known that iso-olefin polymers have been treated with a sulphur halide to effect chemical combination of chlorine and sulphur with the polymer. It is also known that the polymer can be halogenated by an elementary halogen. In carrying out these different types of treatments, it was found difficult to incorporate into the polymer any considerable amount of both halogen and sulphur without causing undesirable degradation of the polymer and resulting product, particularly when the initial polymer subjected to the treatment had a plastic solid consistency and an average molecular weight of a magnitude ranging above about 30,000.

It has been discovered that in using the process of the present invention a better controlled reaction is obtained than was hitherto obtainable in forming halogen and sulphur derivatives of the polymers, and that the polymers treated may be of relatively higher molecular weight with greatly lessened degradation in the resulting product. The result of this improved procedure is an improved product distinguished in its characteristics by higher halogen and sulphur content, greater toughness, and greater resistance to dissolution by various solvents.

The type of hydrocarbon polymers treated includes hydrocarbon compounds having a linear structure characterized by a long chain of carbon atoms interlinked almost entirely by single bonds so that the degree of unsaturation is almost negligible, particularly when the molecular weights of the polymers are of an order of 30,000 and higher. The iodine number of these compounds is very low, e. g. less than 5. Owing to their high degree of saturation, these compounds are very inert. For instance, they are extremely resistant to oxidation and attack by common chemical reagents, such as sulphuric acid, caustic soda, etc. Although they are rubbery in physical characteristics, they are not sulphurizable by conventional methods applicable to rubber. The preferred linear polymers are formed from an iso-olefin, especially isobutylene, which is capable of polymerizing to the extent necessary to give the polymer the desired molecular weight. These preferred linear polymers, known as polybutenes, are constituted of a long chain of carbon atoms with a number of short side chains of alkyl groups with substantially all of the carbon atoms in the molecule substantially saturated with respect to hydrogen, i. e., complete saturation except for possibly one or two double bonds in a chain of 200 or more carbon atoms.

The procedure by which the described polymer is treated in accordance with the present invention involves dissolving the polymer into an inert solvent which is selected to have a boiling point that is no higher than the maximum reaction temperature, and preferably, which is within the optimum reaction temperature range; to have present in the solution of the polymer and the described inert solvent an effective but restricted proportion of a sulphur halide; and to introduce into the solution maintained at the controlled reaction temperature a halogen.

A suitable inert solvent is carbon tetrachloride, which has a boiling point of 76.8° C., and the reaction temperature limits are 60° C. to 100° C., preferably from 65° C. to 85° C.

The amount of polymer dissolved in the inert solvent for the reaction may be from 3 to 10% by weight, and the amount of sulphur halide is restricted to an amount not greater than the maximum amount which can be added to the solution without causing precipitation of polymer from the inert solvent. The use of between 40% and 100% of sulphur halide based on the weight of the polymer, or between 20 cc. and 50 cc. per liter of solution, has been found suitable; although smaller amounts may be used provided they result in the introduction of sufficient sulphur into the product, and somewhat larger amounts may be used provided they are not sufficient to cause precipitation of the polymer from solution and do not greatly increase the boiling point of the mixture. It is preferable to use only sufficient sulphur halide to give the desired sulphur content of the product, which is preferably between about 1 and 2%.

The reaction is preferably carried out at about atmospheric pressure.

The preferred sulphur halide employed is sulphur mono-chloride, and the preferred halogen introduced into the solution is chlorine gas. The reaction mixture may be exposed to sunlight radiation or to diffused light, but is preferably carried out in the dark.

To describe the invention in more detail, the following examples are presented:

Example I

One liter of a solution was made up to contain 50 g. of polybutene having an average molecular weight of about 40,000, and 50 cc. of sulphur monochloride dissolved in the inert solvent, carbon tetrachloride. While this solution was maintained nearly constantly at about 77° C. by boiling, gaseous chlorine was passed into the solution for a period of four hours. At the end of this period of reaction, a product having rubbery characteristics was precipitated from the reaction mixture at room temperature by the addition of isopropyl alcohol. The precipitated solid was very tough and rubbery. It could not be redissolved in carbon tetrachloride, nor in paraffinic or aromatic hydrocarbon solvents. Analysis of this product showed that it contained 1.64% sulphur and 16% chlorine.

When the same procedure was used on the same materials and in the same proportions, except with the omission of the sulphur monochloride, the product, which had a chlorine content of 30% and no sulphur content, was very brittle and by no means tough or rubbery.

Example II

A 5% solution of polybutene, having an average molecular weight of 40,000, in carbon tetrachloride containing 20 cc. of sulphur monochloride per liter was passed countercurrently to a rapid stream of chlorine gas in a packed glass column at 70° C. in the dark. After two passes of the solution through the column, which gave a total contact time of 10 minutes, a tough rubbery reaction product was precipitated by isopropyl alcohol, and this product was found to contain 10% of chlorine and about 1% of sulphur. This rubbery product resembled polybutenes having molecular weights of about 100,000 in toughness and elasticity. The product was insoluble in most organic solvents. Benzol caused a swelling of the material but did not dissolve it. The material was soluble in carbon bisulphide.

From other experiments it was also learned that the sulphur halide could not be used alone as the solvent to obtain the desired product. In the first place, it was found that polybutenes in the range of 30,000 to 100,000 molecular weight are not soluble in sulphur chloride, even on heating. Furthermore, the addition of large amounts of sulphur chloride to the solution of polymer in carbon tetrachloride caused precipitation of the polymer, and also raised the boiling point of the reaction mixture above the desired reaction temperature, with resulting product degradation. When the sulphur chloride was used alone or in excess, and the resulting non-homogeneous mixture chlorinated, the chlorine content of the polymer derivative formed was very low, of the order of 5% and less, and attempts to obtain higher chlorination of the product resulted only in degradation to a tar-like material. The products obtained with the sulphur halide used alone, or in excessive proportions, were soluble in hydrocarbons, in carbon tetrachloride, and partially soluble in alcohol. The tough, rubbery products prepared according to the present invention contain from 10% to 20% of chlorine and from 1% to 2% of sulphur. They are insoluble in paraffinic and aromatic hydrocarbons, insoluble in carbon tetrachloride, insoluble in alcohol; but soluble in carbon bisulphide. Very uniquely, these tough, rubbery products after being precipitated from the reaction mixture solution in carbon tetrachloride cannot be redissolved in carbon tetrachloride.

These new products have many useful properties which adapt them for use in making plastic articles, and they may be used as substitutes for rubber and rubber-like materials, or for compounding with such materials. They are particularly useful where resistance to dissolution by solvents is desired. They are very resistant also to various common chemical agents such as acids, alkalies, and oxidizing agents. They are useful as coating and impregnating agents of fibrous materials such as wood, cloth, paper, and various compositions used for building purposes, also for coating non-fibrous cellulosic and non-porous materials. They may be used compounded with compatible resins and plasticizers, particularly with halogenated organic compounds. They have many advantages for replacing rubber partly or completely in most articles that have been constructed with rubber, e. g., linings of vessels, gaskets, tubes, shock absorbers, etc.

The product may be stabilized by treating with an inorganic or an organic base, e. g., ammonia, amines, etc., or a small amount of organic base may be added to the product to act as a stabilizing agent.

Although it is not intended that this invention be limited by any theory, it might be pointed out that there are several factors involved which combine to make the reaction go in the intended direction. This reaction may be described as including a reaction between the dissolved hydrocarbon polymer and sulphur or sulphur halide, while the polymer is simultaneously undergoing chlorination. The sulphur halide, or sulphur, apparently further acts to control the rate of halogenation, doing this in the manner of an inhibiting catalyst. At the same time, the reaction is very closely regulated with automatic temperature control by the inert solvent or diluent which boils at approximately the desired reaction temperature, the comparatively small amounts of sulphur halide and of polymer present in the reaction mixture having only a small effect on the boiling point of the diluent and the reaction mixtures. Thus, with carbon tetrachloride, any similar alkyl halide, or any other type of solvent which dissolves the hydrocarbon polymer, remains non-reactive during the reaction, and which boils below 100° C., the reaction temperature is properly maintained throughout the reaction.

It is not intended that this invention be limited to any of the specific examples for the purpose of illustration, for modifications which come within the scope and spirit of the invention are intended to be covered insofar as the prior art permits in the appended claims.

I claim:

1. Process of preparing high molecular weight, halogen and sulphur derivatives of linear, plastic, hydrocarbon polymers containing a long chain of saturated carbon atoms formed essentially from an iso-mono-olefin, which comprises reacting said hydrocarbon polymers with a small amount of sulphur chloride homogeneously dissolved in a larger proportion of an inert solvent and simultaneously halogenating said polymer by reaction with gaseous chlorine.

2. Process according to claim 1, in which the reaction temperature is maintained between 60 and 100° C.

3. Process according to claim 1, in which the reaction is continued until the chlorine content of the polymer is above 10% by weight and the sulphur content of the polymer is above 1% by weight.

4. Process according to claim 1, in which the reaction is continued until the chlorine content of the polymer is between the limits of 10% to 20% by weight and the sulphur content of the polymer is between 1% and 2% by weight.

5. Process according to claim 1, in which the inert solvent used is carbon tetrachloride.

6. Process according to claim 1, in which the reaction is carried out at the boiling point of the solvent.

7. The process of preparing a tough, rubbery, chlorinated and sulphurized polybutene immiscible with hydrocarbon oils, which comprises dissolving in carbon tetrachloride from 3% to 10% by weight of a polybutene, having an average molecular weight within the range of about 30,000 to 100,000, admixing sulphur mono-halide with the solution in a proportion of between about 40% and 100% by weight of the polybutene in said solution, heating and maintaining the resulting mixture at a temperature between 65° C. and 85° C., contacting said mixture with gaseous chlorine, and reacting the polymer simultaneously with the sulphur mono-halide and the chlorine until the chlorine content of the polymer is above 10% by weight and the sulphur content of the polymer is above 1% by weight.

8. Process according to claim 7, in which the reaction is carried out at the boiling point of the solvent, carbon tetrachloride.

9. The process of preparing a tough, rubbery, chlorinated and sulphurized product insoluble in hydrocarbon oils, and carbon tetrachloride, which comprises forming a homogeneous solution of a solid rubbery hydrocarbon polymer of an iso-olefin in a large amount of carbon tetrachloride containing a small amount of sulphur monochloride, contacting said solution with gaseous chlorine while maintaining the solution at a temperature between 65° C. and 85° C., and while keeping the proportion of the sulphur monochloride sufficiently low to prevent precipitation of the hydrocarbon polymer but sufficient to effect sulphurization of the polymer, stopping reaction of the polymer when it contains from 1% to 2% by weight of sulphur and at least 10% by weight of chlorine, and precipitating from the reaction solution a tough, rubbery product.

10. A tough, rubbery, chlorinated and sulphurized iso-olefin polymer having a molecular weight above 30,000, containing from 1% to 2% by weight of combined sulphur and at least 10% by weight of combined chlorine, and further characterized by being insoluble in hydrocarbon liquids, insoluble in alcohol, insoluble in carbon tetrachloride, and soluble in carbon bisulphide.

ANTHONY H. GLEASON.